April 1, 1952 R. F. MASON 2,591,176
PISTON RING
Filed Dec. 1, 1949
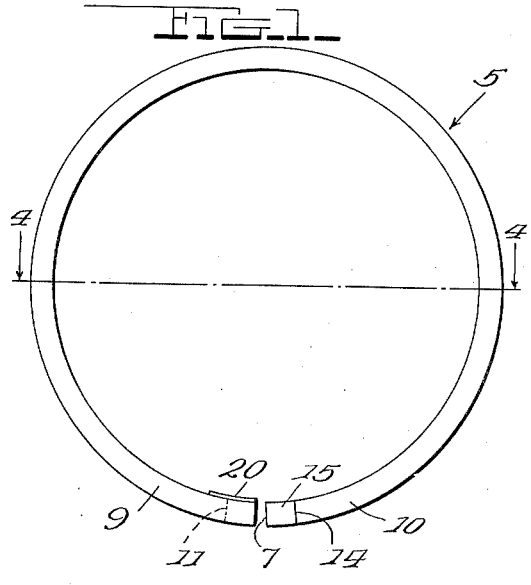
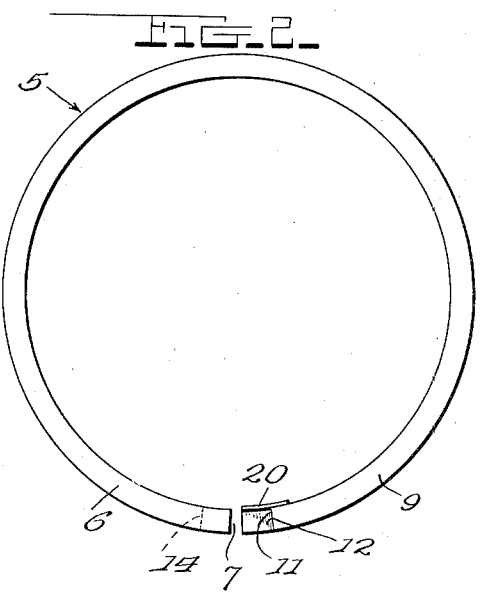
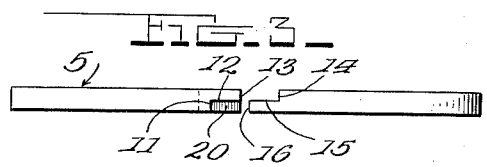
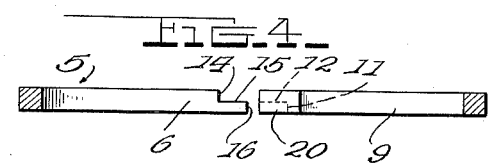
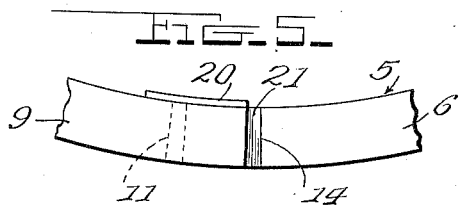
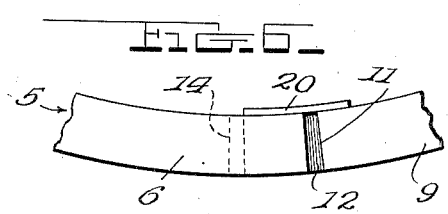
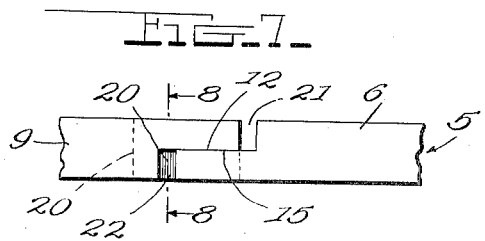
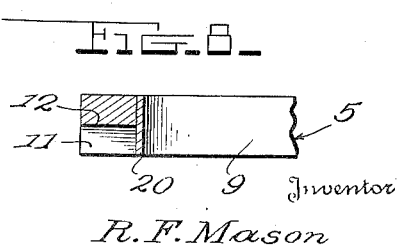
Inventor
R. F. Mason
By Russell E. Patterson,
Attorney Patented Apr. 1, 1952

2,591,176

UNITED STATES PATENT OFFICE 2,591,176

PISTON RING

Robert F. Mason, Magee, Miss.

Application December 1, 1949, Serial No. 130,407

5 Claims. (Cl. 309—46)

The present invention relates to improvements in packing and sealing elements, and more particularly to a piston ring for sealing the pistons of motors, pumps and internal combustion engines.

One object of the invention is to provide a piston ring of the split type with a metal plate adapted to close the gap in the split ring so that the ring will be expanded radially outward by gases or fluids which pass behind the ring between the radial groove wall of the piston ring in the piston.

Another object is to provide a split piston ring having a gap closing plate to provide a sealing wall for the ring and prevent the escape of gases and fluids through the gap so that the expansion forces of said fluids and gases will be exerted on the piston ring in a direction radially outward.

Another object is to provide a split piston ring having mutually engaging stepped surfaces forming the gap of said split ring with a plate-like backing member secured to one end of the ring and arranged to be brought into engagement with the opposite end of the ring.

Another object is to provide a split piston ring with a gap formed by mutually engaging stepped surfaces in which a sealing plate is mounted in back of said stepped surfaces to partially close the mutually stepped portions of the gap in all positions of expansion and contraction.

Another object is to provide a split piston ring having a sealing plate mounted in back of the gap with one end of the ring free to move relative to the plate. The sealing plate being affixed to one end of the ring by welding or the like and arranged in sliding contactual engagement with the other end of the split ring.

Other objects and advantages of the invention will become apparent during the course of the following description of the accompanying drawing wherein:

Figure 1 is a top elevational view of a piston ring showing the manner in which the sealing plate is mounted in the back of the split ring gap.

Figure 2 is a bottom elevational view further showing the manner in which the sealing plate is affixed to one end of the split ring and arranged to project circumferentially so as to slidingly engage the other end of the split ring.

Figure 3 is a front elevational view of the split piston ring showing the sealing plate projecting to one end of the ring so that when said ring is compressed and installed in a piston groove the sealing plate will effectively seal the gap such that compressive forces in the piston groove will urge the piston ring into tight sealing engagement with the walls of the cylinder.

Figure 4 is a rear elevational view and cross section taken on line 4—4 of Figure 1 and looking in the direction of the arrows to further illustrate the shape and location of the gap sealing plate.

Figure 5 is an enlarged fragmentary top elevational view showing the sealing plate affixed to the left hand end on the left side of the gap and extending over the mutually engaging stepped surfaces in sliding engagement with the right hand or side of the gap.

Figure 6 is an enlarged fragmentary bottom plan view showing the sealing plate affixed to the right hand side of the gap and freely movable with the other end of the gap.

Figure 7 is an enlarged fragmentary front elevational view of the split piston ring gap showing the manner in which the sealing plate effectively closes the openings when the ring is compressed, and Figure 8 is a vertical cross-sectional view taken on line 8—8 of Figure 7 and looking in the direction of the arrows to show the manner in which the sealing ring is constructed and the position of the sealing plate.

In the drawing, and more in detail, there is shown for the purpose of convenience of illustration a piston ring generally designated 5 comprising a circular body 6 of substantially square section, and said ring 5 is split as at 7 to permit expansion and contraction to enable the ring to be assembled in the groove of a piston (not shown) and then inserted in a cylinder by compressing the ring to the circular size of the cylinder. The piston ring end portions 9 and 10 are provided with mutually engaging surfaces and as noted in the drawing the end 9 is cut vertically as at 11 to provide a stepped surface 12 terminating in a vertical end wall portion 13. Similarly, the end 10 of the ring (Figure 3) is vertically cut as at 14 to provide a stepped surface 15 which terminates in a vertical end wall 16.

It will readily be seen, that the surfaces 12 and 15 will overlap when the piston ring is compressed so that the vertical surfaces 11 and 16 will approach one another, and the vertical surfaces 13 and 14 will likewise approach one another. Thus, the split piston ring 6 is provided with a scarfed joint to permit expansion and contraction as usual.

The invention comprises a sealing plate 20 which is mounted on the inner circumferential surface of the piston ring 6 and is secured as by welding or the like to the end 9 adjacent the gap 7. The plate 20 is slightly arcuate to conform to the circular shape of the inner peripheral wall of the piston ring 6 and is arranged to terminate at the point of the surface 13 so that when said ends 9 and 10 are moved together by compressing the ring 6, the sealing plate 20 will engage the inner peripheral edge surface of the end 10.

The sealing plate 20 is rectangular in shape and as illustrated in the drawing, is of sufficient length to completely close and seal the lower portion of said gap 7 against the passage of gases during the compression or expansion strokes of the pump or engine on which the ring is used. Further, it is noted that the sealing plate 20 is formed of very thin metal stock such that the overall thickness of the sealing plate and ring will not equal the depth of the piston ring groove of an internal combustion engine or pump piston.

The sealing plate 20 is preferably held in place by being spot welded to the end 9 of the split ring 6, but it is obvious that it can be affixed thereto in various ways. However, spot welding is the most economical, and since piston rings are a production article it has been found that welding the plate 20 in position saves considerable time and does not add materially to the cost of the piston ring.

In operation, the piston ring 5 is installed in the sealing groove of a pump or internal combustion engine piston such that the ring is under compression when in its operative position in the cylinder of an engine or pump with the gap 7 closed as shown in Figures 5 to 8 inclusive. In this position, the sealing plate 20 partially closes the gap between the stepped surfaces 11—16 and 13—14. The sliding surfaces 12 and 15 will be in contactual engagement or nearly so. The plate 20 overlaps the gap 7 and partially closes the spaces as above mentioned so that the expansion forces of gases under compression passing between the walls of the sealing groove and the radial walls of the piston ring at 21 will exert an outward force on the ring in a radial direction toward the cylinder wall of the engine or pump.

In other words, gas under pressure entering the ring groove through the gap 21, upon compression and power strokes, cannot escape through the lower sealed gap 22 and travel on past the piston. Consequently, this gas under pressure will act radially against the ring 5 and hold it against the cylinder wall.

From the above description when taken in connection wtih the accompanying drawing, it will be seen that there has been provided a means whereby the ring is radially urged into tight contactual engagement with the walls of the cylinder without relying upon the usual type of expansion elements. The plate 20 can be very cheaply manufactured and its attachment to the ring represents a very simple operation and will not materially add to the cost of the piston ring.

I claim:

1. In a packing element for the pistons of internal combustion engines and pumps, a split ring having a scarfed joint and a sealing plate affixed to one end of said ring and terminating flush with the end thereof to close the lower portion of said joint.

2. In a piston packing element for internal combustion engines, a split ring having a scarfed joint and an arcuately curved sealing plate secured to the inner periphery of said ring and arranged to terminate flush with one end of said ring to close the lower portion of said gap at said joint.

3. In a piston packing element for internal combustion engines and pumps, a split ring having a joint provided with stepped mutually opposed surfaces, a sealing plate affixed to the inner peripheral surface of the ring adjacent the joint and projecting beyond the stepped portion at one end of said ring to overlie a portion of the other end of said ring and provide a restricted opening for the ingress of expansion gases.

4. In a piston packing element for internal combustion engines and pumps, a split ring having a joint provided with stepped mutually opposed surfaces, an arcuately curved sealing plate affixed to the inner peripheral surface of the ring adjacent one end to bridge said joint and slidably engage the end of said ring opposite said plate said plate being arranged to close the space between the lower stepped mutually engaging surfaces while leaving the space between the upper stepped surfaces open.

5. In a piston packing element for internal combustion engines and pumps, a split ring having a joint formed by stepped mutually opposed surfaces, an arcuately curved sealing plate welded to the inner peripheral surface of the ring adjacent the joint arranged to bridge the same and slidably engage the inner surface of the other end of the ring, said plate being arranged to close the space between the lower stepped mutually engaging surfaces while leaving the space between the upper stepped surfaces open.

ROBERT F. MASON.

REFERENCES CITED

The following references are of record in the file of this patent:

UNITED STATES PATENTS

| Number | Name | Date |
|---|---|---|
| 1,181,618 | Smith | May 2, 1916 |
| 2,315,218 | Olsen | Mar. 30, 1943 |

FOREIGN PATENTS

| Number | Country | Date |
|---|---|---|
| 11,057 | Great Britain | of 1904 |
| 512,934 | Great Britain | of 1939 |
| 492,233 | France | of 1919 |
| 738,643 | France | of 1932 |